US008565722B1

(12) United States Patent
Cheuk et al.

(10) Patent No.: US 8,565,722 B1
(45) Date of Patent: Oct. 22, 2013

(54) REAL TIME TRACKING AT HOME NETWORK OF DATA USAGE ON ROAMING GSM NETWORK

(75) Inventors: Ho Yin Cheuk, Bridgewater, NJ (US); Miguel Angel Carames, Martinez, CA (US); Jay Hsu, Green Brook, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 59 days.

(21) Appl. No.: 12/898,330

(22) Filed: Oct. 5, 2010

(51) Int. Cl.
*H04M 11/00* (2006.01)
*H04M 15/00* (2006.01)
*H04W 24/00* (2009.01)
*H04W 40/00* (2009.01)

(52) U.S. Cl.
USPC ........ 455/408; 455/406; 455/405; 455/456.1; 455/426.2; 379/114.01; 379/114.08; 379/114.28

(58) Field of Classification Search
USPC .......... 455/3.06, 406, 405, 456.1, 426.2, 408; 379/114.01, 114.08, 114.28; 705/43.1, 705/43, 1
See application file for complete search history.

(56) References Cited

U.S. PATENT DOCUMENTS

| 2004/0210524 | A1 | 10/2004 | Benenati et al. |
| 2005/0181758 | A1* | 8/2005 | Ansamaa ...................... 455/406 |
| 2005/0213721 | A1* | 9/2005 | Hakala et al. ............ 379/114.01 |
| 2005/0272440 | A1* | 12/2005 | Li .............................. 455/456.1 |
| 2007/0136195 | A1* | 6/2007 | Banjo ............................. 705/43 |
| 2008/0020704 | A1* | 1/2008 | Costa et al. ................. 455/3.06 |
| 2009/0172782 | A1* | 7/2009 | Taglienti et al. .................. 726/4 |

* cited by examiner

*Primary Examiner* — Opiribo Georgewill

(57) ABSTRACT

A home network may track data usage in real time by a wireless mobile communication device while roaming in a GSM network that is separate from the home network. A Home Location Register (HLR) may receive location information indicative of the location of the wireless mobile communication device in the GSM network. An Online Charging System (OCS) may receive the location information directly or indirectly from the Home Location Register. The Online Charging System may use this location information to determine data rates and cutoff limits which are consistent with subscriber plans and are based on the location of the mobile communication device. This information may be communicated to roaming subscribers in real time and/or used to cut off data communication.

22 Claims, 3 Drawing Sheets

REAL TIME TRACKING AT HOME NETWORK OF DATA USAGE ON ROAMING GSM NETWORK

BACKGROUND

1. Technical Field

This disclosure relates to tracking data usage at a home network by a mobile communication device while in a GSM network

2. Description of Related Art

Subscription plans to mobile data communication networks can include limits on the volume of data which can be communicated and/or the charges for that data communication. Both of these parameters may vary depending upon whether the mobile communication device is communicating data while within the home network or while roaming outside of the home network, such as while roaming within a remote GSM network. The location of the roaming network can also be relevant.

Home network operators may have little or no control over the configuration of the remote GSM network. In turn, this may lead to difficulties in enforcing these limits and pricing plans and/or in providing contemporaneous notice to subscribers when they are approaching a data limit and/or are being charged at an increased data rate.

SUMMARY

A home network may track data usage in real time by a wireless mobile communication device while roaming in a GSM network that is separate from the home network. A Home Location Register (HLR) may receive location information indicative of the location of the wireless mobile communication device in the GSM network. An Online Charging System (OCS) may receive the location information directly or indirectly from the Home Location Register.

The location information may include a Mobile Country Code (MCC) indicative of the country in which the mobile communication device is roaming and/or a Mobile Network Code (MNC) indicative of the operator of the GSM network.

The Home Location Register may receive the location information from a Serving GPRS Support Node (SGSN) within the GSM network through a Gr interface and/or from a Mobile Switching Center within the GSM network through a D interface.

A Subscriber Profile Registry (SPR) may receive the location information from the Home Location Register. A Policy Charging and Rules Function (PCRF) node may receive the location information from the Subscriber Profile Registry through a Sh interface. The Home Location Register may direct the Subscriber Profile Registry to deliver the location information to the Policy Charging and Rules Function node through the Sh interface. The Subscriber Profile Registry may instead deliver the location information to the Policy Charging and Rules Function node through the Sh interface in response to a request from the Policy Charging and Rules Function node.

A Gateway GPRS Support Node (GGSN) may receive the location information from the Policy Charging and Rules Function node through a Gx interface. The Policy Charging and Rules Function node may deliver the location information to the Gateway GPRS Support Node through the Gx interface in response to a request from the Gateway GPRS Support Node.

The Gateway GPRS Support Node may deliver the location information to the Online Charging System through a Gy interface. The Online Charging System (OCS) may receive the location information from the Gateway GPRS Support Node through the Gy interface. The Online Charging System may instead request and receive the location information directly from the Home Location Register using diameter protocol.

The Online Charging System may determine a limit for the data usage by the mobile communication device based on the location information. The Gateway GPRS Support Node may cut off data usage by the wireless mobile communication device while roaming in the GSM network as soon as the data usage by the wireless mobile communication device while roaming in the GSM network has reached the limit. The Gateway GPRS Support Node may instead redirect the customer to a landing page.

The Online Charging System may communicate data usage information relating to pricing or a usage limit in real time to the mobile communication device.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings illustrate illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

Figure 1:
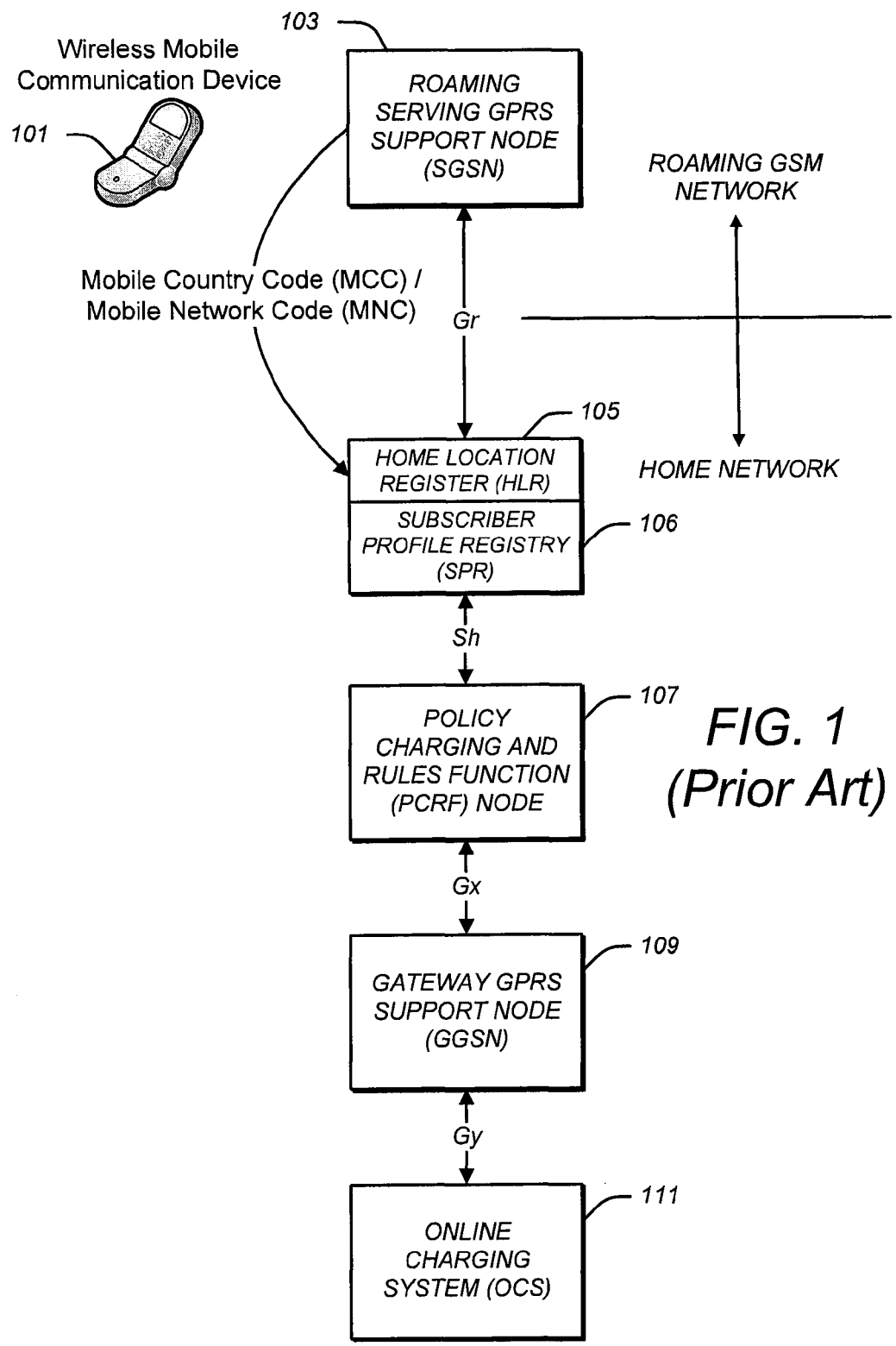
FIG. 1 illustrates an example of a prior art mobile communication network which includes a home network and a roaming GSM network.

FIG. 1 illustrates an example of a prior art mobile communication network which includes a home network and a roaming GSM network.

As illustrated in FIG. 1, a wireless mobile communication device 101 may wirelessly communicate while roaming within a GSM network. The wireless mobile communication device 101 may be of any type. For example, the wireless mobile communication device 101 may be a cell phone, smart cell phone, an embedded module within a laptop computer or other device used for machine to machine communications, or a USB dongle.

The wireless mobile communication device 101 may communicate data within the roaming GSM network. A Roaming Serving GPRS Support Node (SGSN) 203 may enable and manage data connections between the wireless mobile communication device 101 and the roaming GSM network. It may facilitate the delivery of data packets to and from the wireless mobile communication device 101 within its geographical service area. Its task may include packet routing and transfer, mobility management (attached/detached and location management), logical link management, and authentication and charging functions.

A Home Location Register 105 within the home network may contain a database that contains details of each mobile phone subscriber that is authorized to use the home network. The Home Location Register 105 may also contain information about services which the subscriber has requested or been given. The Home Location Register 105 may be configured to store subscription profile information about each mobile phone subscriber and to provide authorization for the services which each subscriber is entitled to use.

The Home Location Register 105 may routinely receive location information relating to the wireless mobile communication device 101 from the Roaming Serving GPRS Support Node 103 and/or from a Roaming Service Mobile Switching Center. This location information may include a Mobile Country Code (MCC) which may be indicative of the country in which the mobile communication device 101 is roaming, as well as a Mobile Network Code (MNC) which may be indicative of the identity of the operator of the roaming GSM network. Information from the Roaming Serving GPRS Support Node 103 may be communicated to the Home Location Register 105 through a Gr Interface between the two. Information from the Roaming Service Mobile Switching Center Node may be communicated to the Home Location Register 105 through a D interface. MAP protocol may be used.

The Home Location Register 105 may communicate with a logically-separate Subscriber Profile Registry (SPR) 106. This registry may be part of the same machine which constitutes the Home Location Register 205 as illustrated in FIG. 1, or a separate machine. The Subscriber Profile Registry 106 may include a database of subscriber information. The Subscriber Profile Registry 106 may store and provide policy and rating information about subscribers.

The Subscriber Profile Registry 106 may communicate with a Policy Charging and Rules Function (PCRF) node 107 through an Sh interface. Diameter protocol may be used. The Policy Charging and Rules Function node 107 may provide policy control management functions. The Policy Charging and Rules Function may provide policy rules information for a subscriber data session. The policy rules may be sent by a PCRF to a GGSN/PGW which may be configured to enforce the policy rules for a subscriber data session.

The Policy Charging and Rules Function node 107 may communicate with a Gateway GPRS Support Node (GGSN) 109 through a Gx interface. Diameter protocol may be used. The Gateway GPRS Support Node 109 may manage the communication between the home network and external packet switch networks, such as the internet, and X.25 networks. The GGSN may serve as an anchor point which enables mobility of a user terminal in GPRS/UMTS networks. The GGSN may be responsible for the interworking between a GPRS network and external packed switched networks. From a roaming perspective, the GGSN may be responsible for interworking between a roaming GPRS network and a home network. It may enforce policy rules provided by the PCRF and also interface with OCS through a Gy interface to request and notify about subscriber data usage. All data communication with the wireless mobile communication device 101 may go through the Gateway GPRS Support Node 109.

The Gateway GPRS Support Node 109 may be configured to communicate with an Online Charging System 211 through a Gy interface. Diameter protocol may be used.

The Online Charging System 111 may be configured to cause customers to be charged in real-time for their data usage. The Online Charging System 111 may specify the rates for data transfer and/or limits on data transfer, both based on a subscription plan.

When data communication is taking place in a remote GSM network, such as is illustrated in FIG. 1, the home network may have difficulties in enforcing data transfer limits and pricing plans. The home network may also have difficulty providing contemporaneous notice to subscribers whom are roaming in the GSM networks when they are approaching a roaming limit and/or are being charged at an increased roaming rate.

Figure 2:
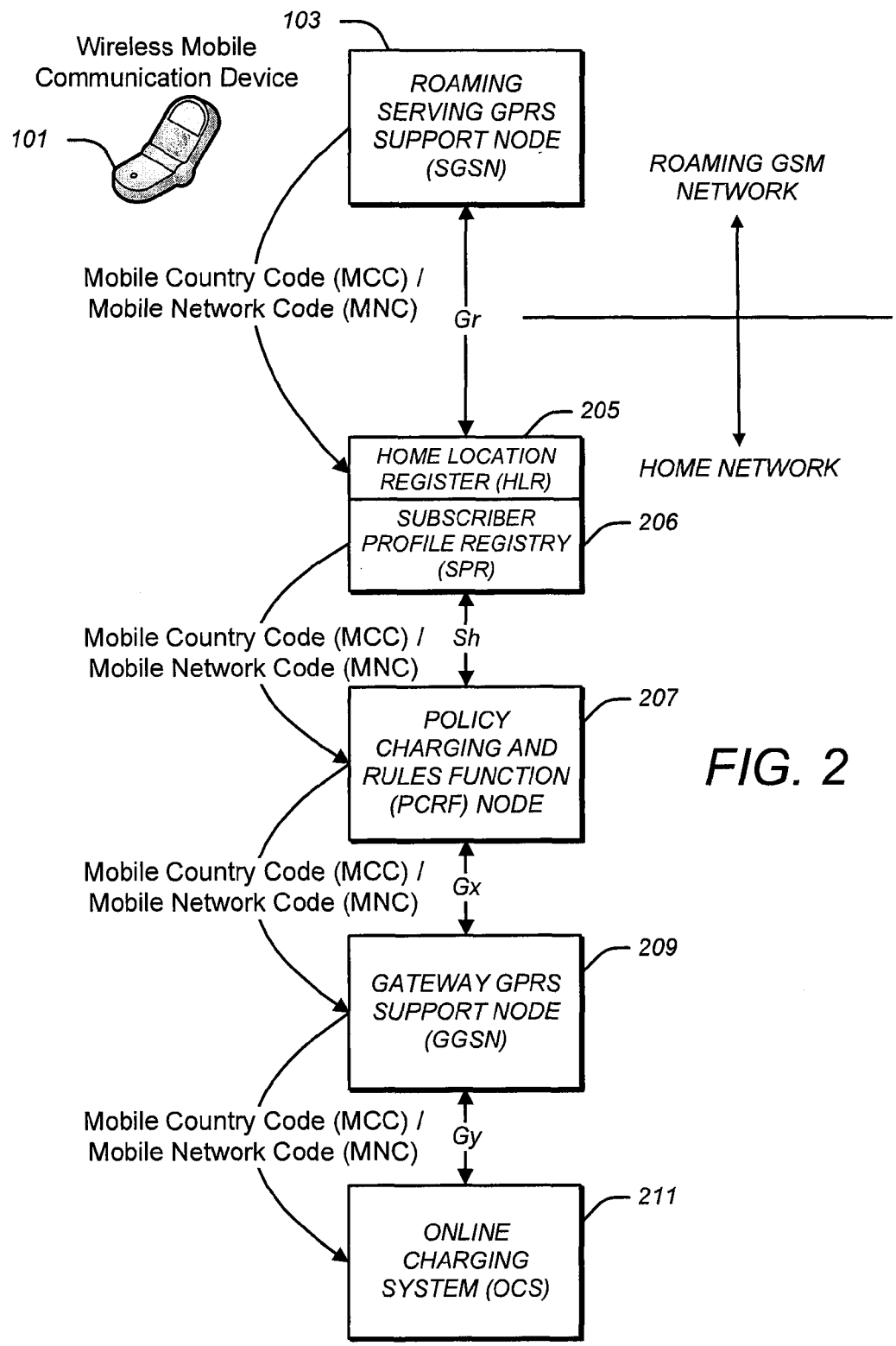
FIG. 2 illustrates a modified version of the mobile communication network that is illustrated in FIG. 1 which may facilitate real time tracking by the home network of data usage in the roaming GSM network.

FIG. 2 illustrates a modified version of the mobile communication network that is illustrated in FIG. 1 which may facilitate real time tracking by the home network of data usage in the roaming GSM network.

Each of the components illustrated in FIG. 2 may continue to perform the same functions as its corresponding component in FIG. 1, as described above. In addition, the Home Location Register 105, Subscriber Profile Registry 106, Policy Charging and Rules Function node 107, Gateway GPRS Support Node 109, and Online Charging System 111 may be modified to perform additional functions as described below.

Specifically, a Home Location Register 205 may additionally provide the location information which it receives from the Roaming Serving GPRS Support Node 103 and/or from the Roaming Serving Mobile Switching Center to the Subscriber Profile Registry 206. Correspondingly, a Subscriber Profile Registry 206 may additionally receive the location information from the Home Location Register 205.

A Policy Charging and Rules Function node 207 may additionally receive the location information from the Subscriber Profile Registry 206. Correspondingly, the Subscriber Profile Registry 206 may additionally provide this information to the Policy Charging and Rules Function node 207. The Home Location Register 205 may additionally direct the Subscriber Profile Registry 206 to deliver the location information to the Policy Charging and Rules Function node 207 on its own volition, and/or in response to a request from the Policy Charging and Rules Function node 207. The location information may be provided by the Subscriber Profile Registry 206 and received by the Policy Charging and Rules Function node 207 through an Sh interface. Diameter protocol may be used.

The Policy Charging and Rules Function node 207 may additionally deliver the location information to a Gateway GPRS Support Node 209. The Gateway GPRS Support Node 209 may additionally request and receive the location information from the Policy Charging and Rules Function node 207. The Policy Charging and Rules Function node 207 may additionally provide this location information in response to a request from the Gateway GPRS Support Node 209. The location information may be delivered by the Policy Charging and Rules Function node 307 and received by the Gateway GPRS Support Node 209 through a Gx interface. Diameter protocol may be used.

The Gateway GPRS Support Node 209 may additionally deliver the location information to the Online Charging System 211 through a Gy interface. Diameter protocol may be used. The Online Charging System 211 may additionally receive the location information from the Gateway GPRS Support Node 209 through the Gy interface. Again, diameter protocol may be used. The Online Charging System 211 may additionally issue a request to the Gateway GPRS Support Node 209, in response to which the Gateway GPRS Support Node 209 may additionally provide the location information to the Online Charging System 211.

The Online Charging System 211 may additionally determine a limit for the volume of data usage by the mobile communication device 101 while roaming in the GSM network based on the location information which it receives and the subscriber's plan. This limit may be different for different locations. For example, the limit while roaming in the GSM network may be lower than the limit while communicating data within the home network. Knowledge of the location information by the Online Charging System 211 may enable the Online Charging System 211 to select the correct limit from the subscriber's plan.

The Gateway GPRS Support Node 209 may communicate with the Online Charging System 211 for the purpose of obtaining information about this limit. The Gateway GPRS Support Node 209 may enforce this limit by, for example, stopping the delivery of data to the wireless mobile communication device 101 through the roaming GSM network as soon as this limit has been reached.

The Online Charging System 211 may additionally communicate data usage information relating to the limit in real-time to the mobile communication device 101. In turn, the mobile communication device 101 may additionally communicate this data usage information to a user of the device, such as through a display on the wireless mobile communication device 101. The data usage information which is communicated may include information about data usage pricing and/or limits and thus enable the user of the mobile communication device 101 to know when continued use might result in a higher data usage charge and/or when a limit may be reached and data communication will be interrupted.

Figure 3:
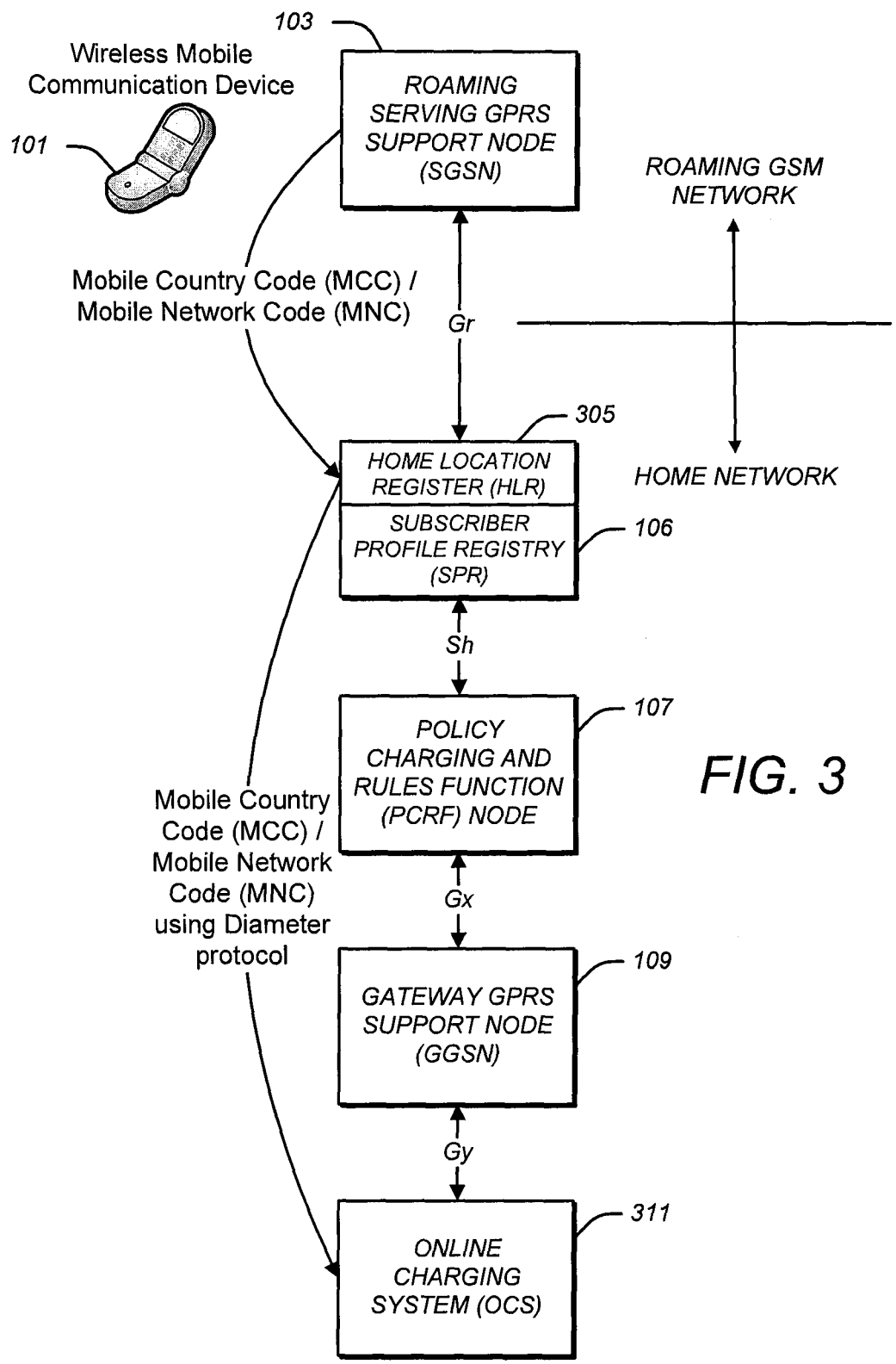
FIG. 3 illustrates a different modified version of the mobile communication network that is illustrated in FIG. 1 which may also facilitate real time tracking by the home network of data usage in the roaming GSM network.

FIG. 3 illustrates a different modified version of the mobile communication network that is illustrated in FIG. 1 which may also facilitate real time tracking by the home network of data usage in the roaming GSM network.

Each of the components illustrated in FIG. 3 may continue to perform the same function as its corresponding component in FIG. 1, as described above. In addition, the Home Location Register 105 and Online Charging System 111 may be modified to perform additional functions as described below.

A Home Location Register 305 may additionally deliver the location information directly to the Online Charging System 311 and the Online Charging System 311 may additionally receive this location information directly from the Home Location Register 305. The Online Charging System 311 may additionally issue a request for this location information to the Home Location Register 305 using the diameter protocol, and the Home Location Register 305 may additionally respond to this request by providing the location information to the Online Charging System 311. FIG. 3 thus illustrates an alternate pathway through which the Online Charging System 311 may receive the location information.

The mobile communication networks illustrated in FIGS. 2 and 3 may thus cause data usage information to be communicated to the wireless mobile communication device 101 in real time while the wireless mobile communication device 101 is roaming in the GSM network. This may enable a user of the wireless mobile communication device 101 while roaming in the GSM network and communicating data to learn, for example, that a special charge is being made, a higher charge is being made, a limit above which a higher charge will be made is near, and/or that a limit will be reached above which data communication will be cut off.

These mobile communication networks similarly may enable the networks to cut off data communication to the wireless mobile communication device 101 while roaming in the GSM network as soon as the data communication by the wireless mobile communication device 101 while roaming in the GSM network has reached a limit.

In both cases, the pricing, limit, and other information may be based on the location of the wireless mobile communication device 101, such as the Mobile Country Code of the country in which the mobile communication device is roaming and/or the Mobile Network Code of the operator of the GSM network. The home network in each instance may thus take into consideration differences in the data pricing and/or cutoff parameters which subscriber plans may specify based on differences in the location of the wireless mobile communication device 101. And they may do so in real time, thus ensuring that timely information may be provided to the subscribers concerning their data usage and/or may be available to enable data cutoff before it exceeds plan limits.

Each of the components of the mobile communication networks which have been described, such as the Roaming Serving GPRS Support Node 103, the Roaming Serving Mobile Switching Center, the Home Location Registers 105, 205, and 305, the Subscriber Profile Registries 106 and 206, the Policy Charging and Rules Function nodes 107 and 207, the Gateway GPRS Support Nodes 109 and 209, and the Online Charging Systems 111, 211, and 311, may include a processing system configured to perform the functions of the component as described herein, the other functions commonly associated with components of their respective type, and/or additional functions. Each of these components may be constructed of computer hardware and software configured to perform these functions. The computer hardware may include one or more microprocessors, memory devices, interfaces, communication devices, and/or other hardware components. The computer software may include one or more operating systems, communication applications, and application programs collectively configured to perform these functions when operated by the computer hardware. The application programs may include algorithms configured to perform these functions, again when operating within the hardware and software environment which has been described.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase means for when used in a claim is intended to and should be interpreted to embrace the corresponding structures and materials which have been described and their equivalents. Similarly, the phrase step for when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

None of the claims are intended to embrace non-statutory subject matter, such as an abstract idea, law of nature or natural phenomena; obvious subject matter; nor subject matter lacking novelty, nor should they be interpreted in such a way. Any unintended embracement of such subject matter is hereby disclaimed.

Except as stated immediately above, nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. A home network which tracks data usage in real time by a wireless mobile communication device while roaming in a GSM network that is separate from the home network, the home network comprising:
   a Home Location Register (HLR) having a processing system configured to receive location information indicative of the location of the wireless mobile communication device in the GSM network;
   an Online Charging System (OCS) having a processing system configured to request the location information from the Home Location Register;
   a Subscriber Profile Registry (SPR) having a processing system configured to receive the location information from the Home Location Register;
   a Policy Charging and Rules Function (PCRF) node having a processing system configured to receive the location information from the Subscriber Profile Registry; and
   a Gateway GPRS Support Node (GGSN) having a processing system configured to receive the location information from the Policy Charging and Rules Function node; wherein:
   the processing system in the Home Location Register is configured to direct the Subscriber Profile Registry to deliver the location information to the Policy Charging and Rules Function node,
   the processing system in the Online Charging System (OCS) is configured to receive the location information from the Gateway GPRS Support Node through a Gy interface,
   the location information includes a Mobile Country Code (MCC) indicative of the country in which the mobile communication device is roaming, and a Mobile Network Code (MNC) indicative of the operator of the GSM network.

2. The home network of claim 1 wherein the processing system in the Home Location Register is configured to receive the location information from a Serving GPRS Support Node (SGSN) within the GSM network.

3. The home network of claim 1 wherein the processing system in the Home Location Register is configured to receive the location information through a Gr interface.

4. The home network of claim 1 wherein the processing system in the Subscriber Profile Registry is configured to deliver the location information to the Policy Charging and Rules Function node in response to a request from the Policy Charging and Rules Function node.

5. The home network of claim 1 wherein the processing system in the Subscriber Profile Registry is configured to deliver the location information to the Policy Charging and Rules Function node through a Sh interface.

6. The home network of claim 1 wherein the processing system in the Policy Charging and Rules Function node is configured to deliver the location information to the Gateway GPRS Support Node in response to a request from the Gateway GPRS Support Node.

7. The home network of claim 1 wherein the processing system in the Policy Charging and Rules Function node is configured to deliver the location information to the Gateway GPRS Support Node through a Gx interface.

8. The home network of claim 1 wherein the processing system in the Online Charging System is configured to determine a limit for the data usage by the mobile communication device based on the location information.

9. The home network of claim 8 wherein the processing system in the Gateway GPRS Support Node is configured to cut off data usage by the wireless mobile communication device or redirect to a landing page while roaming in the GSM network as soon as the data usage by the wireless mobile communication device while roaming in the GSM network has reached the limit.

10. The home network of claim 8 wherein the processing system in the Gateway GPRS Support Node is configured to redirect a user to a landing page while roaming in the GSM network as soon as the data usage by the wireless mobile communication device while roaming in the GSM network has reached the limit.

11. The home network of claim 8 wherein the processing system in the Online Charging System is configured to communicate data usage information relating to the limit in real time to the mobile communication device.

12. A home network system which tracks data usage in real time by a wireless mobile communication device while roaming in a GSM network that is separate from the home network, the home network system comprising:
   a plurality of processing devices including a Home Location Register (HLR), an Online Charging System (OCS), a Subscriber Profile Registry (SPR), a Policy Charging and Rules Function (PCRF), a Gateway GPRS Support Node (GGSN); and
   at least one memory storing executable instructions for causing:
      the Home Location Register to receive location information indicative of the location of the wireless mobile communication device in the GSM network;
      the Online Charging System (OCS) to request the location information from the Home Location Register;
      the Subscriber Profile Registry (SPR) to receive the location information from the Home Location Register;
      the Policy Charging and Rules Function (PCRF) to receive the location information from the Subscriber Profile Registry; and
      the Gateway GPRS Support Node (GGSN) to receive the location information from the Policy Charging and Rules Function node; wherein the memory further stores executable instructions for causing:
the Home Location Register to direct the Subscriber Profile Registry to deliver the location information to the Policy Charging and Rules Function node,
the Online Charging System (OCS) to receive the location information from the Gateway GPRS Support Node through a Gy interface,
wherein the location information includes a Mobile Country Code (MCC) indicative of the country in which the mobile communication device is roaming, and a Mobile Network Code (MNC) indicative of the operator of the GSM network.

13. The home network system of claim 12, wherein the at least one memory further stores executable instructions for causing the Home Location Register to receive the location information from a Serving GPRS Support Node (SGSN) within the GSM network.

14. The home network system of claim 12, wherein the at least one memory further stores executable instructions for causing the Home Location Register to receive the location information through a Gr interface.

15. The home network system of claim 12, wherein the at least one memory further stores executable instructions for causing the Subscriber Profile Registry to deliver the location information to the Policy Charging and Rules Function node in response to a request from the Policy Charging and Rules Function node.

16. The home network system of claim 12, wherein the at least one memory further stores executable instructions for causing the Subscriber Profile Registry to deliver the location information to the Policy Charging and Rules Function node through a Sh interface.

17. The home network system of claim 12, wherein the at least one memory further stores executable instructions for causing the Policy Charging and Rules Function node to deliver the location information to the Gateway GPRS Support Node in response to a request from the Gateway GPRS Support Node.

18. The home network system of claim 17, wherein the at least one memory further stores executable instructions for causing the Policy Charging and Rules Function node to deliver the location information to the Gateway GPRS Support Node through a Gx interface.

19. The home network system of claim 12, wherein the at least one memory further stores executable instructions for causing the Online Charging System to determine a limit for the data usage by the mobile communication device based on the location information.

20. The home network system of claim 19, wherein the at least one memory further stores executable instructions for causing the Gateway GPRS Support Node to cut off data usage by the wireless mobile communication device or redirect to a landing page while roaming in the GSM network as soon as the data usage by the wireless mobile communication device while roaming in the GSM network has reached the limit.

21. The home network system of claim 19, wherein the at least one memory further stores executable instructions for causing the Gateway GPRS Support Node to redirect a user to a landing page while roaming in the GSM network as soon as the data usage by the wireless mobile communication device while roaming in the GSM network has reached the limit.

22. The home network system of claim 19, wherein the at least one memory further stores executable instructions for causing the Online Charging System to communicate data usage information relating to the limit in real time to the mobile communication device.

* * * * *